US006547963B1

United States Patent
Tsai

(10) Patent No.: US 6,547,963 B1
(45) Date of Patent: Apr. 15, 2003

(54) STRUCTURE OF WATER TANK WITH ULTRAVIOLET-RAY STERILIZATION LAMP

(76) Inventor: Hsi-Hu Tsai, No. 27, Lane 67, Hushan Road, Yingge Jenn, Taipei Hsien (TW)

(*) Notice: Subject to any disclaimer, the term of this patent is extended or adjusted under 35 U.S.C. 154(b) by 42 days.

(21) Appl. No.: 09/610,077

(22) Filed: Jul. 5, 2000

(51) Int. Cl.[7] .............................. B01J 19/12; C02F 1/32
(52) U.S. Cl. .................... 210/232; 210/512.1; 210/748; 250/436; 250/437
(58) Field of Search .................................. 210/169, 232, 210/512.1, 542, 748; 250/436, 437; 422/24, 186.3

(56) References Cited

U.S. PATENT DOCUMENTS

| | | | |
|---|---|---|---|
| 1,505,669 A | * | 8/1924 | Quain |
| 3,659,096 A | * | 4/1972 | Kompanek |
| 3,791,790 A | * | 2/1974 | Wyndham et al. |
| 4,101,777 A | * | 7/1978 | Reid |
| 4,956,754 A | * | 9/1990 | Chen |
| 5,069,885 A | * | 12/1991 | Ritchie |
| 5,178,758 A | * | 1/1993 | Hwang |
| 5,247,178 A | * | 9/1993 | Ury et al. |
| 5,540,848 A | * | 7/1996 | Engelhard |
| 5,915,161 A | * | 6/1999 | Adams |

* cited by examiner

Primary Examiner—Fred Prince

(57) ABSTRACT

The invention is related to an improved water tank with an ultraviolet sterilization lamp. It is especially to make water directly contact the sterilization lamp during sterilization. Inside the lamp, there is no air accumulation. The improved water tank with an ultraviolet ray sterilization lamp is characterized as effective and optimal in sterilization effect with prolonged time period for sterilization. The improvement characteristics include a water inlet and an outlet, which are respectively equipped at the inner sides of the front and the rear joint connected to the inner side of a tube at the tangent location. A spiral strip is set at the externals of the sterilization lamp. Both ends of the sterilization lamp are equipped with fixture rings, which are internally laid with O-shaped rubber rings and are locked by tightening rings to firmly fasten both ends of the sterilization lamp at the external end of the front joint and the rear joint.

4 Claims, 4 Drawing Sheets

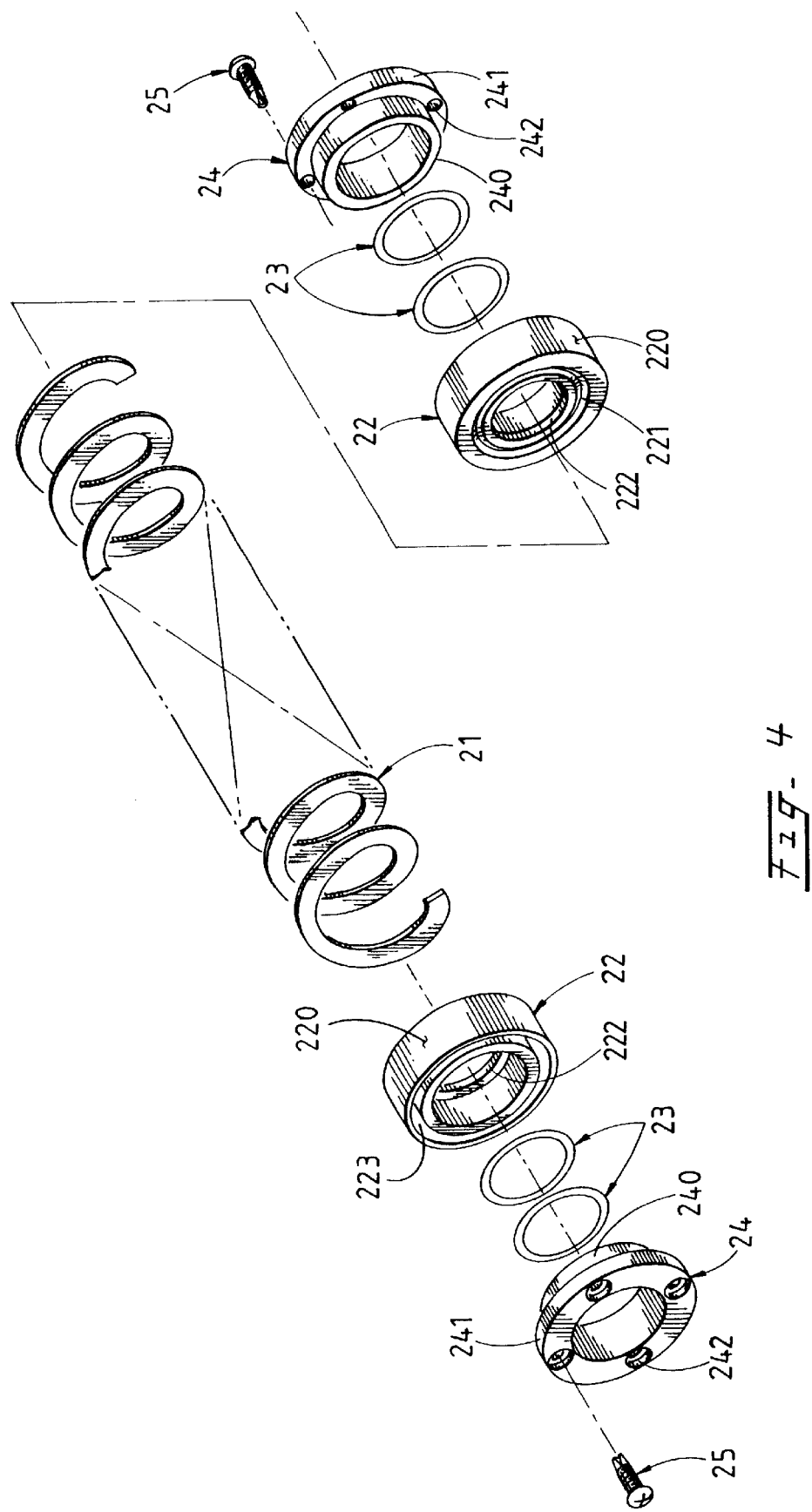

STRUCTURE OF WATER TANK WITH ULTRAVIOLET-RAY STERILIZATION LAMP

BACKGROUND OF THE INVENTION

1) Field of the Invention

The invention is related to a kind of improved water tank with an ultraviolet ray sterilization lamp. It is especially to make water directly contact with the sterilization lamp during sterilization. Inside the lamp, there is no air accumulation. The improved water tank with an ultraviolet ray sterilization lamp is characterized as effective and optimal in sterilization effect with prolonged time period for sterilization.

2) Description of the Prior Art

As shown in FIG. 5, a prior water tank with a sterilization lamp during sterilization is comprised of inner tube 1, external tube 2, front joint 3, rear joint 4, front cover 5, rear cover 6, and sterilization lamp 7. Inner tube 1 of the prior water tank with a sterilization lamp is made of glass for light transmission from sterilization lamp 7. By utilizing a water pump, the water in a tank or a pool can be pumped from inlet 8 located at the lower central front lateral side of external tube 2 through a gap between inner tube I and external tube 2 and reaches the rear end. Then, water flows from outlet 9 located at the lower central rear lateral side of external tube 2 and returns the original water tank or pool as a completion circle for sterilization with the light generated from sterilization lamp 7 and transmitting inner tube 1. The optimal distance of sterilization for prior sterilization lamp 7 is within 7 mm. Sterilization effect is decreased when the distance is over 7 mm. The longer the distance, the weaker the effect. Also, sterilization effect greatly decreases if there is any obstacle. Because sterilization lamp 7 of the prior water tank with a sterilization lamp and water undergoing sterilization 20 are separated by inner tube 1 for at least 4 mm and accumulated dirt on the lateral side of inner tube occurs after certain period of time, the illumination from sterilization lamp 7 is covered and it leads to sterilization effect reduction. In the mean time, when water undergoing sterilization 20 flows through the gap between inner tube 1 and external tube 2, the amount of water is below half of the volume for sterilization lamp 7. Air accumulates for the other half space with electric waste and without sterilization effect. Moreover, sterilization lamp 7 of a prior water tank with a sterilization lamp penetrates front joint 3 and rear joint 4 with no fixture mechanism. It easily leads to loosening or breakdown. Many users criticize the above defects. Thus, the inventor realized that there was a need for further study of product improvement and researched to overcome the disadvantages of prior products. Based on accumulated personal experience to the product, the inventor eventually developed the invention, improved water tank with a sterilization lamp.

The followings are brief description for optimal embodiments of the invention for committee's better understanding in the structural assembly and operations of the invention.

BRIEF DESCRIPTION OF THE DRAWINGS

FIG. 4 is an exploded drawing of improved partial components for the invention.

DETAILED DESCRIPTION OF THE PREFERRED EMBODIMENT

Figure 1:
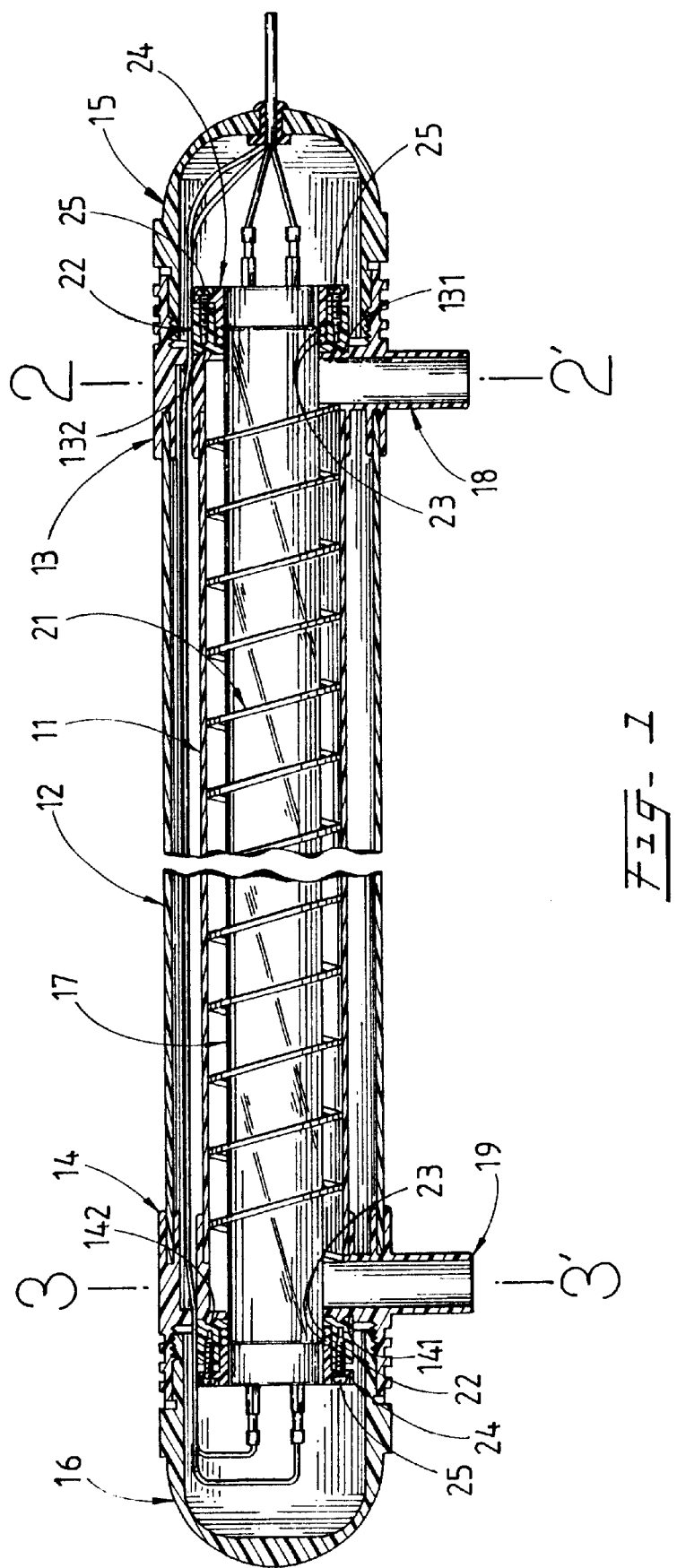
FIG. 1 is a sectional drawing of embodiment for the invention.
Figure 3:
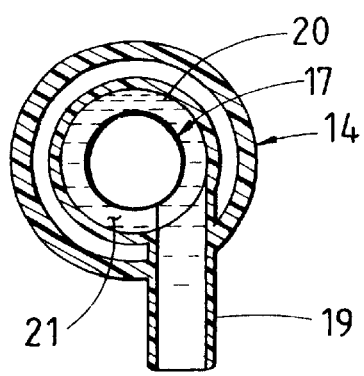
FIG. 3 is a drawing of section 3–3' in FIG. 1 of the invention.
Figure 2:
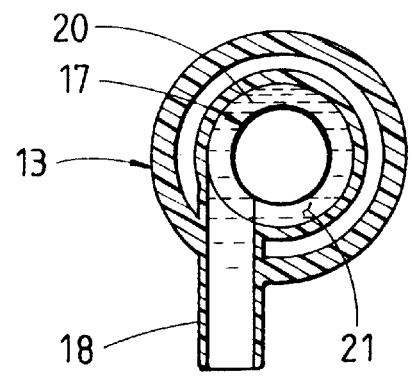
FIG. 2 is a drawing of section 2–2' in FIG. 1 of the invention.
Figures 5, 6:
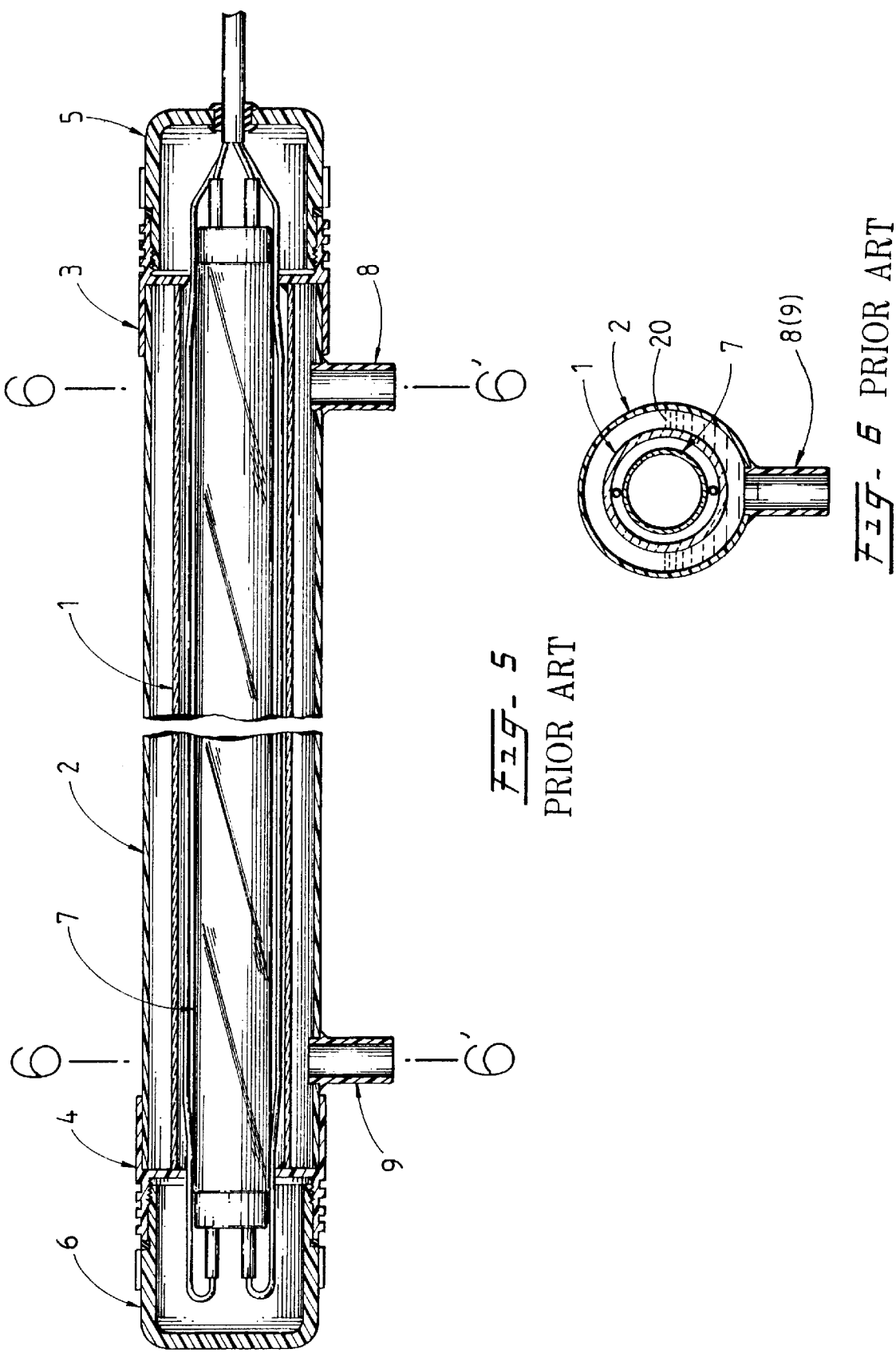
FIG. 5 is a sectional drawing of prior water tank with ultraviolet ray sterilization lamp.
FIG. 6 is a drawing of section 6–6' in FIG. 5.

The embodiment of the invention is illustrated as follows:

As shown in FIG. 1, the appearance of the water tank with a sterilization lamp is identical as a prior water tank with a sterilization lamp. It mainly comprises of inner tube 11, external tube 12, front joint 13, rear joint 14, front cover 15, rear cover 16, and sterilization lamp 17. The improvement of the invention is characterized as follows:

1. The inlet 18 and outlet 19 are set in the inner sides of front joint 13 and rear joint 14 respectively, and are connected with the inner side of inner tube 11 at the tangent location as shown in FIGS. 2 and 3. The lateral side of sterilization lamp 17 is placed a spiral strip 21. Thus, when the water pumped from a water tank or pool passes inlet 18 and enters inner tube 11, it flows along the spiral strip 21 to completely fill inner tube 11 and to wrap the covering of sterilization lamp 17 as shown in FIGS. 2 and 3. Then, the water flows from the front end of inner tube 11 to the rear end for complete sterilization and comes out from outlet 19 to return the original water tank or pool.

2. Both ends of sterilization lamp 17 are equipped with fixture ring 22, which are internally laid with O-shaped rubber rings 23 and are locked by tightening rings 24 with at least one pair of screws 25 to firmly fasten both ends of sterilization lamp 17 at the lateral sides of front joint 13 and rear joint 14 to avoid loosening as shown in FIG. 1. Also, water undergoing sterilization 20 flowing into inner tube 11 will not flow from the gap between sterilization lamp 17 and front joint 13 or rear joint 14 and reaches the lateral side of front joint 13 and rear joint 14.

As shown in FIG. 4 and FIG. 1, fixture rings 22 of the invention are plastic molded rings 220 with extruded rings 221. They can be fixed and locked at extruded ring 132 and 142 of external hole 131 and 141 on front joint 13 and rear joint 14 for interlock. Each plastic molded ring 220 is molded a bearing edge 222 on the inner bottom portion to insert at least an O-shaped rubber ring 23. Also, there is a concave groove ring 223 for the use of screw 25 fixture. Tightening ring 24 is in convex shape. On its external side, there is extruded edge 241, which is at least formed a pair of fish-eye holes 242. After the combination of ring 240 and plastic molded ring 220 of fixture ring 22, self-driving screw 25 penetrates fish-eye hole 242 to firmly lock fixture ring 22. The O-shaped rubber ring 23 inside plastic molded rings 220 flattens and deforms with shrinkage to firmly clamp sterilization lamp 17 to avoid loosening or water leakage.

As shown in FIGS. 2 and 3, it is obvious that water undergoing sterilization 20 entering inner tube 11 directly contacts with sterilization lamp 17 when the improved water tank with a sterilization lamp of the invention functions. Thus, there is no so-called isolation of sterilization distance. The sterilization result is effective. Also, water undergoing sterilization 20 entering inner tube 11 does not directly and quickly flow from the front end to the rear end. It flows along spiral strip 21, which is inside inner tube 11 heading the rear end. Thus, sterilization distance is increased for more than 5 times of that and sterilization effect is also raised for more than 5 times of that. Because water undergoing sterilization 20 completely fills inner tube 11 and directly contacts sterilization lamp 17, sterilization effect is not only effective but also is complete due to the multiple times of sterilization distance with no air accumulation inside inner tube 11 and without electricity waste. Moreover, both ends of sterilization lamp 17 of the invention are respectively locked to the external sides of front joint 13 and rear joint 14 by using fixture ring 22, tightening ring 24 and at least an O-shaped rubber ring 23 to prevent from leaking, loosening, breakdown, or damage for sterilization lamp 17.

The above explanation is a substantial embodiment of the invention, which provides greater practical performance than products of prior art. Furthermore, the present invention meets all new patent application requirements and is lawfully submitted for review and the granting of the commensurate patent rights to thereby encourage the spirit of invention and its rightful protection under the patent law.

What is claimed is:

1. A water tank with an ultraviolet sterilization lamp comprising:

an external tube, an inner tube put inside said external tube, a front joint and a rear joint connected with said external tube and said inner tube, a front cover and a rear cover placed over opposite ends of said external tube, a sterilization lamp radiating ultraviolet rays, an inlet set in the internal side of said front joint and tangentially connected with the inner side of said inner tube, an outlet set in the internal side of said rear joint and tangentially connected with the inner side of said inner tube, a spiral strip placed around the lateral side of said sterilization lamp, two fixture rings internally laid with O-shaped rubber rings, with which both ends of said sterilization lamp are equipped, two tightening rings locked by said fixture rings and said O-shaped rubber rings for firmly fastening both ends of said sterilization lamp at the lateral sides of said front joint and said rear joint to avoid loosening.

2. The water tank with an ultraviolet sterilization lamp in claim 1, wherein each of said fixture rings is a plastic molded ring that further includes:

one external hole installed on the exterior side of said front joint and said rear joint respectively, a protruding ring formed in each of said external holes, an extruded ring projecting from the aforementioned fixture ring for fixation and conjoinment with the protruding ring of external hole on said front joint and rear joint respectively, a bearing edge on the inner bottom portion of said fixture ring for interlocking at least one 9-shaped rubber ring, and a concave groove ring for the use of a screw fixture.

3. The water tank with an ultraviolet sterilization lamp in claim 1, wherein each of said tightening rings in convex shape includes an extruded edge on the external side of said tightening ring, which is at least equipped with a pair of fish-eye holes on the extruded edge of said tightening ring.

4. The water tank with an ultraviolet sterilization lamp in claim 3, wherein each of said fish-eye holes is threaded by a self-driving screw, after said tightening rings combining with said fixture rings, to firmly lock said fixture rings with said tightening rings and thus the O-shaped rubber rings inside said fixture rings flatten and deform with shrinkage to firmly clamp the externals of said sterilization lamp to avoid loosening or water leakage.

\* \* \* \* \*